United States Patent
Tao

(10) Patent No.: US 11,048,865 B2
(45) Date of Patent: Jun. 29, 2021

(54) PROCESSING AND DISPLAYING HANDWRITTEN NOTE BASED ON FORMAT CHANGE OF CONTENT IN ELECTRONIC BOOK

(71) Applicant: ZHANGYUE TECHNOLOGY CO., LTD, Beijing (CN)

(72) Inventor: Hongtao Tao, Beijing (CN)

(73) Assignee: ZHANGYUE TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 16/968,943

(22) PCT Filed: Jan. 29, 2019

(86) PCT No.: PCT/CN2019/073786
§ 371 (c)(1),
(2) Date: Aug. 11, 2020

(87) PCT Pub. No.: WO2019/154198
PCT Pub. Date: Aug. 15, 2019

(65) Prior Publication Data
US 2021/0056256 A1    Feb. 25, 2021

(30) Foreign Application Priority Data
Feb. 12, 2018 (CN) .......................... 201810145897.5

(51) Int. Cl.
*G06F 40/171* (2020.01)
*G06F 40/109* (2020.01)
(Continued)

(52) U.S. Cl.
CPC .......... *G06F 40/171* (2020.01); *G06F 3/0483* (2013.01); *G06F 40/109* (2020.01); *G06F 40/169* (2020.01)

(58) Field of Classification Search
CPC .... G06F 40/171; G06F 40/169; G06F 40/109; G06F 3/0483
See application file for complete search history.

(56) References Cited

U.S. PATENT DOCUMENTS

| | | | | |
|---|---|---|---|---|
| 6,687,876 | B1 * | 2/2004 | Schilit ................... | G06F 40/169 715/231 |
| 7,284,192 | B2 * | 10/2007 | Kashi ...................... | G06F 40/14 715/232 |

(Continued)

FOREIGN PATENT DOCUMENTS

| | | |
|---|---|---|
| CN | 101937312 A | 1/2011 |
| CN | 104239282 A | 12/2014 |

(Continued)

OTHER PUBLICATIONS

International Patent Application No. PCT/CN2019/073786; Int'l Search Report; dated May 6, 2019; 2 pages.

*Primary Examiner* — Asher D Kells
(74) *Attorney, Agent, or Firm* — BakerHostetler

(57) ABSTRACT

Disclosed are a method for displaying a handwritten note in an electronic book, an electronic device and a computer storage medium. The handwritten note includes a marking line. The method includes: acquiring the marking line input by a user via handwriting, and recording a first character and a last character of characters marked by the marking line; when it is detected that a format of the characters of the electronic book is adjusted, determining new positions of the first character and the last character after format adjustment; and processing and displaying the marking line based on the new positions of the first character and the last character.

16 Claims, 5 Drawing Sheets

(51) Int. Cl.
*G06F 40/169* (2020.01)
*G06F 3/0483* (2013.01)

(56) References Cited

U.S. PATENT DOCUMENTS

| | | | | |
|---|---|---|---|---|
| 7,546,525 | B2* | 6/2009 | Bargeron | G06F 3/04883 715/230 |
| 10,083,160 | B1* | 9/2018 | Yu | G06F 3/0483 |
| 10,417,310 | B2* | 9/2019 | Biswas | G06K 9/00436 |
| 10,599,758 | B1* | 3/2020 | Yu | G06F 16/24573 |
| 2004/0252888 | A1* | 12/2004 | Bargeron | G06F 40/171 382/188 |
| 2005/0044106 | A1* | 2/2005 | Duncan | G06K 9/00402 |
| 2005/0044295 | A1* | 2/2005 | Wakeam | G06F 40/171 710/72 |
| 2005/0053283 | A1* | 3/2005 | Wakeam | G06K 9/00993 382/186 |
| 2005/0183005 | A1* | 8/2005 | Denoue | G06F 40/169 715/202 |
| 2006/0050969 | A1* | 3/2006 | Shilman | G06F 40/171 382/224 |
| 2006/0147117 | A1* | 7/2006 | Wakeam | G06K 9/00402 382/186 |
| 2006/0218171 | A1* | 9/2006 | Wakeam | G06K 9/00463 |
| 2007/0061704 | A1* | 3/2007 | Simova | G06F 40/14 715/210 |
| 2007/0157076 | A1* | 7/2007 | Lin | G06F 40/171 715/231 |
| 2012/0030558 | A1 | 2/2012 | Chiu et al. | |
| 2012/0317471 | A1 | 12/2012 | Ma | |
| 2014/0115436 | A1* | 4/2014 | Beaver | G06F 40/169 715/229 |
| 2016/0070686 | A1* | 3/2016 | Yu | G06F 16/958 715/230 |
| 2016/0070687 | A1* | 3/2016 | Shigeta | G06F 3/0481 715/232 |
| 2016/0070688 | A1* | 3/2016 | Yao | G06F 40/169 715/232 |
| 2019/0220507 | A1* | 7/2019 | Foss | G06F 40/171 |

FOREIGN PATENT DOCUMENTS

| | | |
|---|---|---|
| CN | 108304361 A | 7/2018 |
| JP | 2006-331055 A | 12/2006 |

* cited by examiner

PROCESSING AND DISPLAYING HANDWRITTEN NOTE BASED ON FORMAT CHANGE OF CONTENT IN ELECTRONIC BOOK

CROSS-REFERENCE TO RELATED APPLICATION

This application is a National Stage of International patent application PCT/CN2019/073786, filed Jan. 29, 2019 which claims priority to Chinese Patent Application NO. 201810145897.5, titled "METHOD FOR DISPLAYING HANDWRITTEN NOTE IN ELECTRONIC BOOK, COMPUTATION DEVICE AND COMPUTER STORAGE MEDIUM", filed Feb. 12, 2018, the entire contents of which are incorporated herein by reference.

TECHNICAL FIELD

The disclosure relates to the technical field of an electronic book, and in particular to a method for displaying handwritten note in an electronic book, an electronic device and a computer storage medium.

BACKGROUND

With continuous development of science, technology and society, E-book is popular due to its advantages of energy conservation and environmental protection, multiple types and low price. In order to further improve popularity of the electronic book and improve using experience of the user for the electronic book, more and more electronic book terminals support an operation that the user writes notes via handwriting in the electronic book, for example, the user handwrites a marking line in the electronic book by a stylus matching the user terminal, to mark content which is interested by the user.

Presently, for the electronic book terminal supporting handwriting notes, a position of a handwritten note of the user in a terminal screen of the electronic book is generally recorded, and the handwritten note of the user is displayed based on the position.

However, with the above method for displaying the handwritten note in the electronic book, when a format of the characters of the electronic book marked by the marking line is adjusted (for example font scaling), the marking line generally does not match the marked characters of the electronic book. As shown in FIG. 1, the user marks characters of "是非成败转 头空" in the electronic book by a handwritten marking line. When the font of the electronic book is enlarged (that is, the format of the characters of the electronic book marked by the user is adjusted), a display interface shown in FIG. 2 is presented. Since the position of the marking line in the terminal screen of the electronic book is recorded, positions relative to the screen and sizes of marking lines in FIG. 2 and FIG. 1 do not change. In this case, content marked by the marking line after font enlargement does not match the content originally marked, resulting in bad experience and reducing the amount of users.

SUMMARY

In view of above, a method for displaying a handwritten note in an electronic book, an electronic device and a computer storage medium are provided according to the present disclosure, to solve the above problems or at least partially solve the above problems.

According to an aspect of the present disclosure, a method for displaying a handwritten note in an electronic book is provided. The handwritten note includes a marking line. The method includes:

acquiring the marking line input by a user via handwriting, and recording a first character and a last character of characters marked by the marking line;

when it is detected that a format of the characters of the electronic book is adjusted, determining new positions of the first character and the last character after format adjustment;

and processing and displaying the marking line based on the new positions of the first character and the last character.

According to another aspect of the present disclosure, an electronic device is provided. The electronic device includes: at least one processor; and at least one memory, the at least one memory storing executable instructions that upon execution cause the at least one processor to perform operations, the operations comprising:

acquiring the marking line input by a user via handwriting, and recording a first character and a last character of characters marked by the marking line;

when it is detected that a format of the characters of the electronic book is adjusted, determining new positions of the first character and the last character after format adjustment; and processing and displaying the marking line based on the new positions of the first character and the last character.

According to another aspect of the present disclosure, a non-volatile computer readable storage medium is provided. The non-volatile computer readable storage medium stores at least one executable instruction. The executable instruction causes a processor to perform operations of:

acquiring the marking line input by a user via handwriting, and recording a first character and a last character of characters marked by the marking line;

when it is detected that a format of the characters of the electronic book is adjusted, determining new positions of the first character and the last character after format adjustment; and processing and displaying the marking line based on the new positions of the first character and the last character.

According to another aspect of the present disclosure, a computer program product is further provided. The computer program product includes computer programs stored on the non-volatile computer readable storage medium described above.

With the method for displaying a handwritten note in an electronic book, the electronic device and the computer storage medium according to the present disclosure, a marking line input via handwriting by a user is acquired, and a first character and a last character of characters marked by the marking line are recorded. When it is detected that a format of the character of the electronic book is adjusted, new positions of the first character and the last character after format adjustment are determined. Finally, the marking line is processed and displayed based on the new positions of the first character and the last character. With the above solutions, the problem in the prior art that the handwritten note can not match the characters of the electronic book after the format of the characters of the electronic book marked by the handwritten note is adjusted is solved, thereby improving user experience and thus increasing the amounts of users.

The summary of the technical solutions of the present disclosure is described above. The technical means of the present disclosure may be understood clearer according to content of detailed description. In order to make the above and other objects, features and advantages of the present disclosure clearer and easier to be understood, specific embodiments of the present disclosure are described hereinafter.

BRIEF DESCRIPTION OF THE DRAWINGS

According to the detailed description of preferred embodiments of the present disclosure, all of advantages and benefits become clear for those skilled in the art. Drawings are only used to illustrate the preferred embodiments rather than limit the present disclosure. Throughout the drawings, the same components are represented by the same reference numeral. In the drawings.

DETAILED DESCRIPTION

Schematic embodiments of the present disclosure are described in detail with reference to the drawings hereinafter. Although the drawings show the schematic embodiments of the present disclosure, it should be understood that the present disclosure may be implemented by various embodiments and is not limited by embodiments clarified herein. Practically, the embodiments are described herein so that the present disclosure can be understood thoroughly and the whole content of the present disclosure can be completely present to those skilled in the art.

Figure 3:
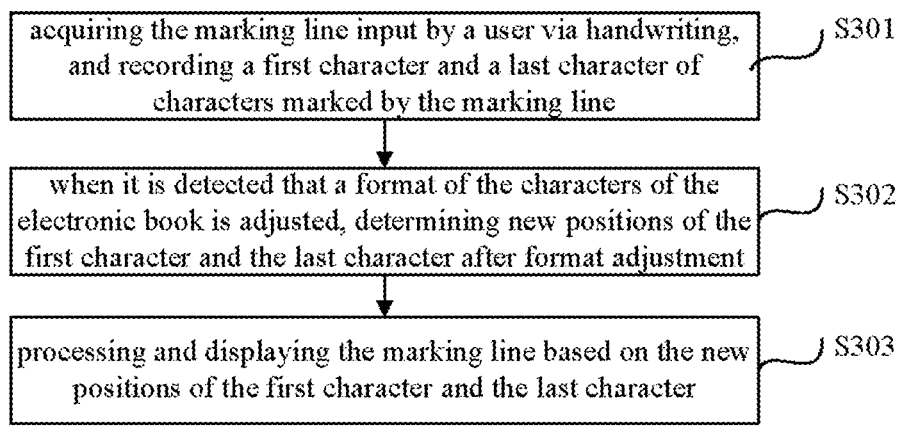
FIG. 3 is a schematic flowchart of a method for displaying a handwritten note in an electronic book according to an embodiment of the present disclosure.

FIG. 3 is a schematic flowchart of a method for displaying a handwritten note of an electronic book according to an embodiment of the present disclosure. The handwritten note includes a marking line. As shown in FIG. 3, the method includes steps S301 to S303 in the following.

Step S301, acquiring the marking line input by a user via handwriting, and recording a first character and a last character of characters marked by the marking line.

When the user inputs the marking line in the electronic book via handwriting, the marking line is acquired. Types of the marking line input via handwriting by the user are not limited in the present disclosure. For example, the marking line may be at least one of: a straight line, a curve, a dotted line and an ellipse. Further, a first character and a last character of the characters marked by the marking line are recorded. The first character and the last character may be different characters or the first character and the last character may be the same character.

Figure 1:
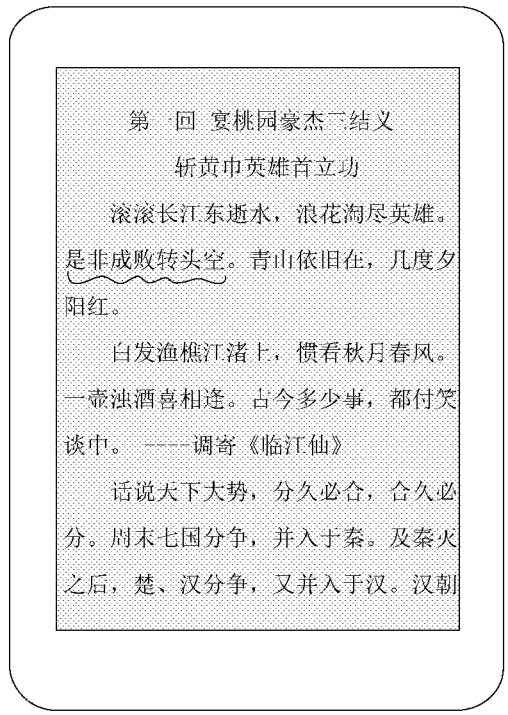
FIG. 1 is a schematic diagram showing a display interface in which a handwritten note of an electronic book before adjusting a format of characters of the electronic book is displayed.

As shown in FIG. 1, the user inputs a wave type of marking line by handwriting. In this step, the marking line is acquired and stored. A storage manner may be set by those skilled in the art. For example, the marking line can be stored in a picture format. Further, a first character and a last character of characters marked by the marking line are recorded. In FIG. 1, characters "是非成败转头空" are marked by the marking line, and thus a first character and a last character of the characters marked by the marking line are "是" and "空" respectively.

Step S302, when it is detected that a format of the characters of the electronic book is adjusted, determining new positions of the first character and the last character after format adjustment.

The format adjustment in the embodiment includes at least: font adjustment such as scaling font and adjusting spacing between the characters, and paragraph adjustment such as adjusting indenting, adjusting line spacing and adjusting a gap between paragraphs.

Figure 4:
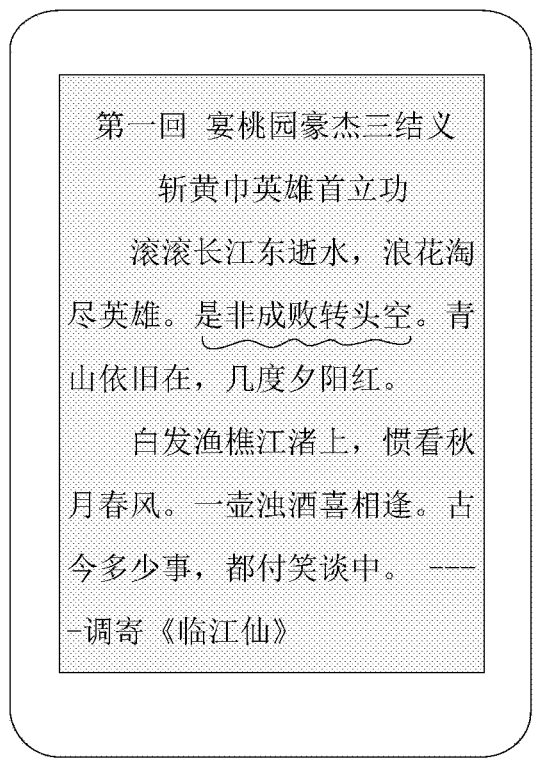
FIG. 4 is a schematic diagram showing a display interface in which a handwritten note of the electronic book after adjusting a format of characters of the electronic book is displayed according to an embodiment of the present disclosure.

When it is detected that the format of the characters of the electronic book is adjusted, new positions of the first character and the last character of the characters marked by the marking line after format adjustment are determined. As shown in FIG. 4, when it is detected that a font of the characters of the electronic book is enlarged, new positions of the first character "是" and the last character "空" are determined.

Step S303, processing and displaying the marking line based on the new positions of the first character and the last character.

The marking line is processed based on the new positions of the first character and the last character determined in step S302. Processing manners for the marking line are not limited in the embodiment. Those skilled in the art may process the marking line in a suitable manner as needed, so that the marking line matches the marked characters. The processed marking line is displayed near the characters subjected to the format adjustment, so that the processed marking line starts from the new position of the first character and ends at the new position of the last character.

Figure 2:
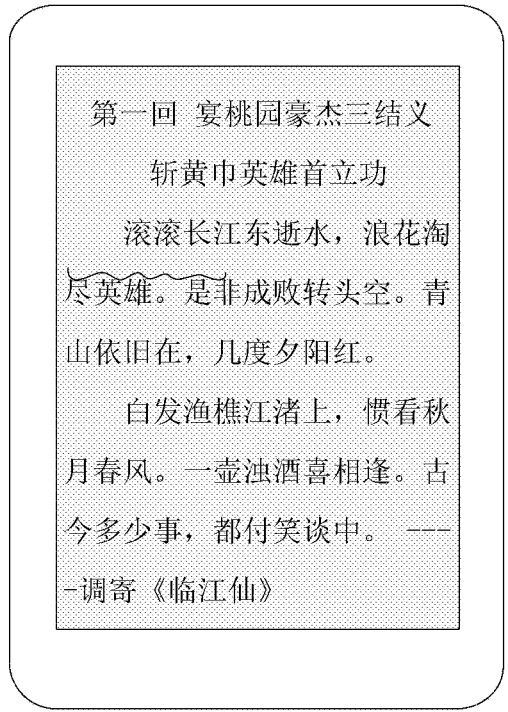
FIG. 2 is a schematic diagram showing a display interface in prior art in which a handwritten note of an electronic book after adjusting a format of characters of the electronic book is displayed.

As shown in FIG. 4, according the new positions of the first character "是" and the last character "空" of the characters marked by the marking line, the original marking line is stretched and is displayed below the characters "是非成败转头空" subjected to the format adjustment, thereby avoiding the case shown in FIG. 2 that the marking line does not match the marked characters after the format of the marked characters is adjusted.

With the method for displaying a handwritten note in an electronic book according to the embodiment of the present disclosure, a marking line input by handwriting by a user is acquired. Unlike the technical solution in the prior art that a recorded position of the marking line is located by a screen of the electronic book, in this embodiment the recorded positions of the marking line is located by the first character and the last character of the characters marked by the marking line. When it is detected that a format of the characters of the electronic book is adjusted, new positions of the first character and the last character after the format adjustment are determined. Finally, the marking line is processed and displayed based on the new positions of the first character and the last character. With this solution, the problem in the prior art that the handwritten note does not match the characters of the electronic book after the format of the characters marked by the handwritten note of the user is adjusted is solved, thereby improving user experience and thus increasing the amounts of users.

Figure 5:
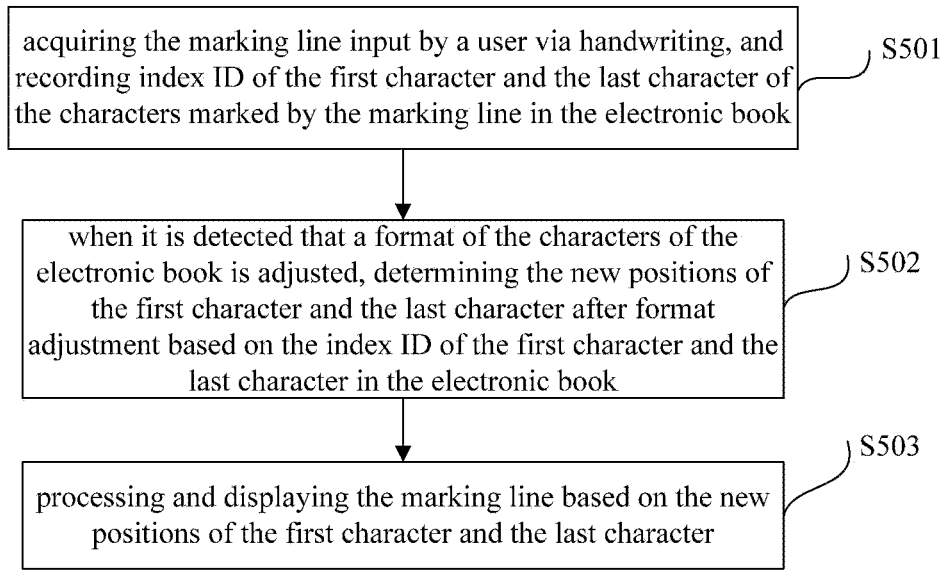
FIG. 5 is a schematic flowchart of a method for displaying a handwritten note of an electronic book according to another embodiment of the present disclosure.

FIG. 5 is a schematic flowchart of a method for displaying a handwritten note in an electronic book according to another embodiment of the present disclosure. The handwritten note includes a marking line. As show in FIG. 5, the method includes steps S501 to S503 in the following.

Step S501, acquiring the marking line input by a user via handwriting, and recording index ID of the first character and the last character of the characters marked by the marking line in the electronic book.

In a specific implementation process, the user may manually input the marking line in the electronic book by a stylus or fingers. The marking line may be at least one of: a straight line, a curve, a dotted line and an ellipse and so on. After the user inputs the marking line by handwriting, the marking line is acquired. Optionally, the acquired marking line may be stored in a picture format.

Further, each character in the electronic book has a corresponding index ID, and a corresponding character can be quickly and uniquely positioned by the index ID. For example, by an index ID "a first character in a first paragraph" of "Romance of the Three Kingdoms", a first character "第" in the electronic book "Romance of the Three Kingdoms" can be quickly and accurately positioned. Therefore, in the embodiment, after the marking line input by handwriting by the user is acquired, index ID of the first character and the last character of the characters marked by the marking line are recorded. As shown in FIG. 1, the characters marked by the marking line are "是非成败转头空" thus the first character and the last character of the characters marked by the marking line are "是" and "空" respectively. Therefore, in this step, the index ID "a sixteenth character in a second paragraph" corresponding to the first character "是", and the index ID "a twenty second character in the second paragraph" corresponding to the last character "空" are recorded. Since the first character and the last character of the characters marked by the marking line may be the same character (for example, a certain character is marked by drawing a circle) or may be different characters, the index ID of the first character and the last character marked by the marking line recorded in this step may be the same or different.

Optionally, in an actual implementation process, the marking line may be stored in connection with the index ID of the corresponding first character and last character. After the marking line is deleted, the recorded index ID of the first character and last character corresponding to the marking line may be deleted.

Step S502, when it is detected that a format of the characters of the electronic book is adjusted, determining the new positions of the first character and the last character after format adjustment based on the index ID of the first character and the last character in the electronic book.

When the characters of the electronic book change in at least one of the following manners: font type conversion (such as, converting from regular script to Song typeface), color change (such as, changing from black to white), bold font and italic, positions of the characters marked by the marking line do not change. Therefore, in the embodiment, the format adjustment may include only format adjustment which changes positions of the marked characters, such as scaling font, adjusting spacing between the characters, adjusting indenting, adjusting line spacing, or adjusting a gap between paragraphs.

When it is detected that the format of the characters of the electronic book is adjusted, new positions of the first character and the last character of the marked characters after format adjustment are quickly determined, based on the index ID of the first character and the last character of the marked characters recorded in step S501.

Step S503, processing and displaying the marking line based on the new positions of the first character and the last character.

Specifically, after the format of the characters of the electronic book is adjusted, based on the new positions of the first character and the last character determined in step S502, the marking line may be adjusted by a preset way that performs at least one of stretching the marking line or splitting the marking line and displayed.

Optionally, a stretching ratio is determined based on a first length and a second length, the first length is a display length of the characters of the electronic book before format adjustment, the second length is a display length of the characters of the electronic book after format adjustment, and the marking line is stretched based on the stretching ratio. As shown by FIG. 1 and FIG. 4, the characters marked by the marking line are "是非成败转头空". A display length of the characters before format adjustment is determined as 50 mm based on positions of the first character and the last character before format adjustment, a display length of the characters after format adjustment is determined as 60 mm based on new positions of the first character and the last character, and thus the stretching ratio is determined as 60/50. That is, the marking line is stretched to 60/50 of the original length.

Figure 6A:
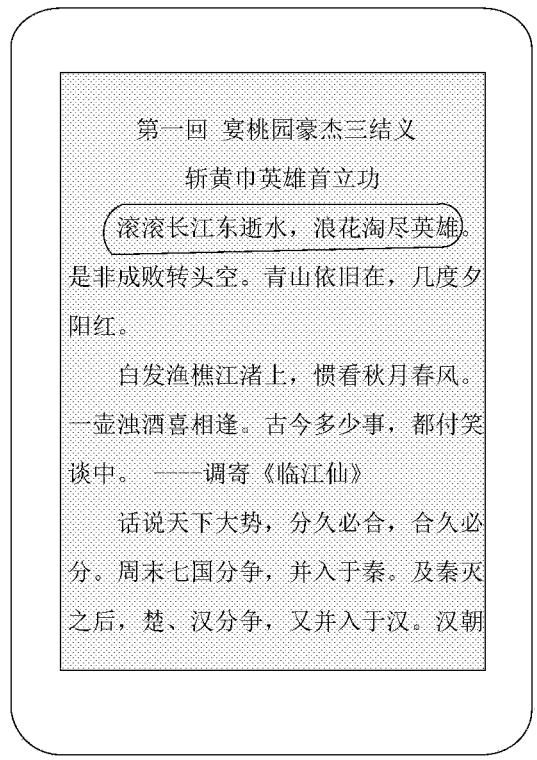
FIG. 6a is a schematic diagram showing a display interface in which a handwritten note of an electronic book before adjusting a format of characters of the electronic book is displayed according to another embodiment of the present disclosure.
Figure 6B:
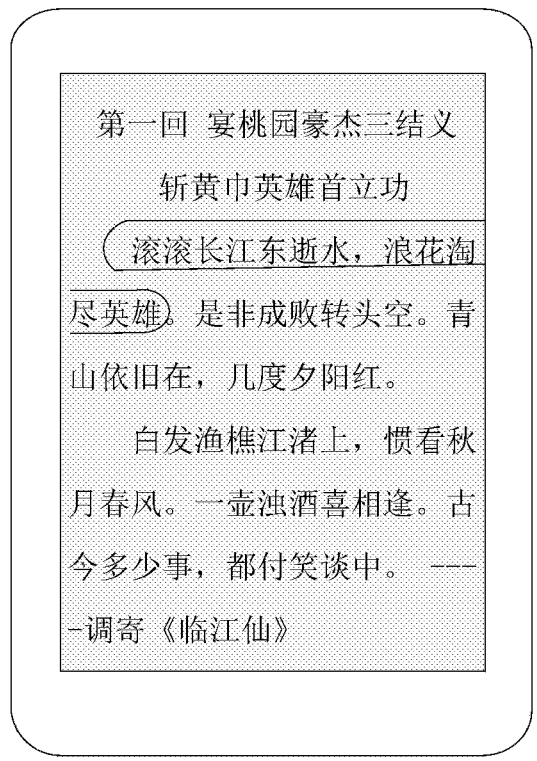
FIG. 6b is a schematic diagram showing a display interface in which a handwritten note of an electronic book after adjusting a format of characters of the electronic book is displayed according to another embodiment of the present disclosure.

Optionally, when the characters marked by the marking line after format adjustment comprise the line break identifier, the marking line is split at the position of the line break identifier. As shown in FIG. 6*a*, the characters marked by the marking line are "滚滚长江东逝 水，浪花淘金英雄". As shown in FIG. 6*b*, after the format of the characters is adjusted, a line break identifier exists behind the character "淘" in the characters "滚滚长江东逝水，浪花淘金 英雄", and the marking line is split at the position of the line break identifier.

Herein, those skilled in the art should understand that the marking line may be stretched and split in combination. As shown in FIG. 6*a*, the characters marked by the marking line are "滚滚长江东逝水，浪花淘金英雄" whose display length is 100 mm. As shown in FIG. 6*b*, after the format of the characters of the electronic book is adjusted, the display length becomes 120 mm, and thus the stretching ratio is determined as 120/100. Thus, the marking line is stretched to 120/100 of the original length, and further, the marking line is split at the position of the line break identifier.

Optionally, in order to further improve a matching degree between the marking line and the marked characters after format adjustment, in step S501, a relative positions of an initial point of the marking line and the first character of the marked characters of the electronic book may be recorded. In a process of displaying the processed marking line, a display position of the processed marking line is determined, based on the relative position of the initial point of the marking line and the first character of the marked characters of the electronic book recorded in advance, and a new position of the first character. For example, if the marking line is a straight line and relative positions of the initial point of the marking line and a lower left vertex of an external rectangle of the marked first character recorded in Step 501 are (0.1 mm, 0.2 mm), when the processed marking line is displayed, relative positions of an initial point of the processed marking line and a lower left vertex of an external rectangle of the first character at the new position after format adjustment are also (0.1 mm, 0.2 mm). Therefore, the processed marking line starts from the new position of the first character, and ends at the new position of the last character.

With the method for displaying a handwritten note in an electronic book according to the embodiment of the present disclosure, a marking line input by handwriting by a user is acquired first. Unlike from the technical solution in the prior art that a recorder position of the marking line is located by a screen, index ID of the first character and the last character of the characters marked by the marking line are recorded in the embodiment. The first character and the last character can be quickly and accurately determined by the index ID. When it is detected that a format of the characters of the electronic book is adjusted, new positions of the first character and the last character after format adjustment are determined based on the index ID of the first character and the last character. Finally, the marking line is processed and displayed based on the new positions of the first character and the last character. With this solution, the problem in the prior art that the handwritten note does not match the characters of the electronic book after the format of the characters of the electronic book marked by the handwritten note is adjusted is solved, thereby improving user experience and thus increasing the amount of users.

A non-volatile computer readable storage medium is provided according to an embodiment of the present disclosure. The non-volatile computer readable storage medium stores at least one executable instruction which can perform the method according to any method embodiment described above.

The executable instruction may cause a processor to perform operations of:

acquiring the marking line input by a user via handwriting, and recording a first character and a last character of characters marked by the marking line;

when it is detected that a format of the characters of the electronic book is adjusted, determining new positions of the first character and the last character after format adjustment; and processing and displaying the marking line based on the new positions of the first character and the last character.

In an optional embodiment, the executable instruction causes the processor to perform operations of:

recording index ID of the first character and the last character of the characters marked by the marking line in the electronic book; and determining the new positions of the first character and the last character after format adjustment based on the index ID of the first character and the last character in the electronic book.

In an optional implementation, the executable instruction causes the processor to perform operations of:

adjusting the marking line by a preset way that performs at least one of stretching the marking line or splitting the marking line; and displaying the adjusted marking line.

In an optional embodiment, the executable instruction causes the processor to perform operations of:

determining a stretching ratio based on a ratio of a first length and a second length, the first length is a display length of the characters of the electronic book before format adjustment, the second length is a display length of the characters of the electronic book after format adjustment; and stretching the marking line based on the stretching ratio.

In an optional embodiment, the executable instruction causes the processor to perform operations of:

splitting the marking line at a position of a line break identifier when the characters of the electronic book after format adjustment comprise the line break identifier.

Figure 7:
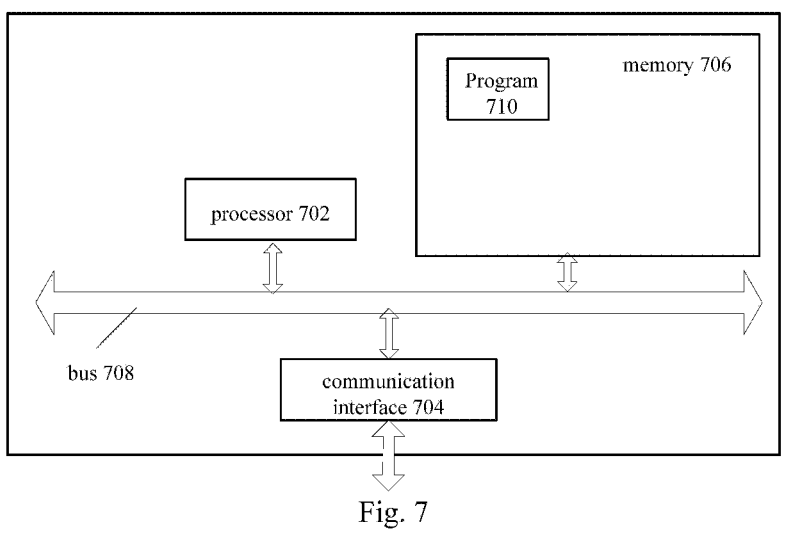
FIG. 7 is a schematic structural diagram of an electronic device according to an embodiment of the present disclosure.

FIG. 7 is a schematic structural diagram of an electronic device according to an embodiment of the present disclosure. Specific implementations of the electronic device are not limited in the embodiments.

As shown in FIG. 7, the electronic device may include: a processor 702, a communication interface 704, a memory 706 and a communication bus 708.

The processor 702, the communication interface 704 and the memory 706 communicate with each other via the bus 708. The communication interface 704 is configured to perform network element communication with other device such a client or a server. The processor 702 is configured to execute programs 710, and specifically, execute related steps in the above method embodiments.

The programs 710 may cause the processor 702 to perform operations of:

acquiring the marking line input by a user via handwriting, and recording a first character and a last character of characters marked by the marking line;

when it is detected that a format of the characters of the electronic book is adjusted, determining new positions of the first character and the last character after format adjustment; and processing and displaying the marking line based on the new positions of the first character and the last character.

In an optional embodiment, the programs 710 causes the processor 702 to perform operations of:

recording index ID of the first character and the last character of the characters marked by the marking line in the electronic book; and determining the new positions of the first character and the last character after format adjustment based on the index ID of the first character and the last character in the electronic book.

In an optional embodiment, the programs 710 causes the processor 702 to perform operations of:

adjusting the marking line by a preset way that performs at least one of stretching the marking line or splitting the marking line; and displaying the adjusted marking line.

In an optional embodiment, the programs 710 causes the processor 702 to perform operations of:

determining a stretching ratio based on a ratio of a first length and a second length, the first length is a display length of the characters of the electronic book before format adjustment, the second length is a display length of the characters of the electronic book after format adjustment; and stretching the marking line based on the stretching ratio.

In an optional embodiment, the programs 710 causes the processor 702 to perform operations of:

splitting the marking line at a position of a line break identifier when the characters of the electronic book after format adjustment comprise the line break identifier.

The algorithm and display described herein is not inherently related to a certain computer, virtual system or other device. Various general systems may be used together based on the teaching herein. According to the above description, structures for constructing the system are obvious. In addition, the present disclosure is not for any certain programming language. It should be understood that, the present disclosure may be implemented by various programming languages, and the above specific description is used to disclose the optimal embodiments of the present disclosure.

A large number of details are illustrated here in the specification. However, it should be understood that the embodiments of the present disclosure may be implemented without these details. In some examples, well-known methods, structures and technology are not illustrated in detail, so as not to obscure understanding of the present disclosure.

Similarly, it should be understood that, for simplifying the present disclosure and assisting understanding one or more of aspects of the present disclosure, features of the present disclosure are provided in a single embodiment, drawing or description thereof, in the description of the schematic embodiments of the present disclosure above. However, the method according to the present disclosure should not be interpreted as follows: the claimed disclosure has more features than those recited definitely in each claim. More definitely, as shown by the claims attached below, each claim recites less features than those disclosed in a single embodiment. Therefore, a claim corresponding to a certain embodiment is definitely incorporated into the embodiment, and each claim functions as a single embodiment of the present disclosure.

Those skilled in the art should understand that modules in the device of the embodiment may be changed adaptively and may be arranged in one or more devices, different from the embodiment herein. The modules, units or components in the embodiment may be combined into one module, unit or component, and the module, unit or component may be divided into multiple sub-modules, subunits or subcomponents. Unless the features and/or processes or units conflict with each other, all features disclosed in the specification (including the accompanying claims, abstract and drawings) and all processes or units in the method or device in the present disclosure may be combined in any manner. Unless definitely illustrated, each feature disclosed in the specification (including the accompanying claims, abstract and drawings) may be replaced with alternative features which may achieve the same, equivalent or similar object.

In addition, those skilled in the art should understand that although some embodiments described here include certain features rather than all features included in other embodiments, different embodiments can be formed by combining of features of different embodiments within the scope of the present disclosure. For example, in the following claims, the claimed embodiments may be used by combining in any manner.

It should be understood that the above embodiments are used to illustrate the present disclosure rather than limiting the present disclosure, and alternative embodiments may be designed by those skilled in the art without departing from the scope of the attached claims. In the claims, any reference symbol in the parentheses should not be constructed as limiting the claims. The term "comprising" does not preclude elements or steps not listed in the claims. Element defined by "a" or "an" does not preclude that there are multiple elements. The present disclosure may be implemented by hardware including several different elements and appropriate programming by means of a computer. In a unit claim including multiple devices, the multiple devices may be implemented by the same hardware. Terms of first, second and third and so on do not represent any order. The terms may be explained as names.

What is claimed is:

1. A method for displaying a handwritten note in an electronic book, wherein the handwritten note comprises a marking line and the method comprises:
   acquiring the marking line input by a user via handwriting, and recording a first character and a last character of characters marked by the marking line;
   when it is detected that a format of the characters of the electronic book is adjusted, determining new positions of the first character and the last character after format adjustment;
   processing and displaying the marking line based on the new positions of the first character and the last character;
   wherein the recording a first character and a last character of characters marked by the marking line further comprises recording index ID of the first character and the last character in the electronic book; and
   wherein the determining new positions of the first character and the last character after format adjustment further comprises determining the new positions of the first character and the last character based on the index ID of the first character and the last character in the electronic book.

2. The method according to claim 1, wherein the processing and displaying the marking line based on the new positions of the first character and the last character comprises:
   adjusting the marking line by a preset way that performs at least one of stretching the marking line or splitting the marking line; and
   displaying the adjusted marking line.

3. The method according to claim 2, wherein the stretching the marking line comprises:
   determining a stretching ratio based on a ratio of a first length and a second length, the first length is a display length of the characters of the electronic book before format adjustment, the second length is a display length of the characters of the electronic book after format adjustment; and
   stretching the marking line based on the stretching ratio.

4. The method according to claim 3, wherein the splitting the marking line comprises:
   splitting the marking line at a position of a line break identifier when the characters of the electronic book after format adjustment comprise the line break identifier.

5. The method according to claim 2, wherein the splitting the marking line comprises:
   splitting the marking line at a position of a line break identifier when the characters of the electronic book after format adjustment comprise the line break identifier.

6. The method according to claim 1, wherein the processing and displaying the marking line based on the new positions of the first character and the last character comprises:
   adjusting the marking line by a preset way that performs at least one of stretching the marking line or splitting the marking line; and
   displaying the adjusted marking line.

7. An electronic device, comprising:
at least one processor; and
at least one memory, the at least one memory storing executable instructions that upon execution cause the at least one processor to perform operations, the operations comprising:
acquiring the marking line input by a user via handwriting, and recording a first character and a last character of characters marked by the marking line;
when it is detected that a format of the characters of the electronic book is adjusted, determining new positions of the first character and the last character after format adjustment;
processing and displaying the marking line based on the new positions of the first character and the last character;
wherein the recording a first character and a last character of characters marked by the marking line further comprises recording index ID of the first character and the last character in the electronic book; and
wherein the determining new positions of the first character and the last character after format adjustment further comprises determining the new positions of the first character and the last character based on the index ID of the first character and the last character in the electronic book.

8. The electronic device according to claim 7, wherein the operations further comprise:
adjusting the marking line by a preset way that performs at least one of stretching the marking line or splitting the marking line; and
displaying the adjusted marking line.

9. The electronic device according to claim 8, wherein the operations further comprise:
determining a stretching ratio based on a ratio of a first length and a second length, the first length is a display length of the characters of the electronic book before format adjustment, the second length is a display length of the characters of the electronic book after format adjustment; and
stretching the marking line based on the stretching ratio.

10. The electronic device according to claim 9, wherein the operations further comprise:
splitting the marking line at a position of a line break identifier when the characters of the electronic book after format adjustment comprise the line break identifier.

11. The electronic device according to claim 8, wherein the operations further comprise:
splitting the marking line at a position of a line break identifier when the characters of the electronic book after format adjustment comprise the line break identifier.

12. The electronic device according to claim 7, wherein the operations further comprise:
adjusting the marking line by a preset way that performs at least one of stretching the marking line or splitting the marking line; and
displaying the adjusted marking line.

13. A non-volatile computer readable storage medium storing at least one executable instruction, wherein the executable instruction is configured to cause a processor to perform operations of:
acquiring the marking line input by a user via handwriting, and recording a first character and a last character of characters marked by the marking line;
when it is detected that a format of the characters of the electronic book is adjusted, determining new positions of the first character and the last character after format adjustment;
processing and displaying the marking line based on the new positions of the first character and the last character;
wherein the recording a first character and a last character of characters marked by the marking line further comprises recording index ID of the first character and the last character in the electronic book; and
wherein the determining new positions of the first character and the last character after format adjustment further comprises determining the new positions of the first character and the last character based on the index ID of the first character and the last character in the electronic book.

14. The non-volatile computer readable storage medium according to claim 13, wherein the executable instruction is configured to further cause the processor to perform operations of:
adjusting the marking line by a preset way that performs at least one of stretching the marking line or splitting the marking line; and
displaying the adjusted marking line.

15. The non-volatile computer readable storage medium according to claim 14, wherein the executable instruction is configured to further cause the processor to perform operations of:
determining a stretching ratio based on a ratio of a first length and a second length, the first length is a display length of the characters of the electronic book before format adjustment, the second length is a display length of the characters of the electronic book after format adjustment; and
stretching the marking line based on the stretching ratio.

16. The non-volatile computer readable storage medium according to claim 14, wherein the executable instruction is configured to further cause the processor to perform operations of:
splitting the marking line at a position of a line break identifier when the characters of the electronic book after format adjustment comprise the line break identifier.

* * * * *